US010661904B1

(12) United States Patent
Oleson

(10) Patent No.: US 10,661,904 B1
(45) Date of Patent: May 26, 2020

(54) STOWABLE HARNESS FAN ASSEMBLY FOR A LOW-BACK DIVAN

(71) Applicant: Rockwell Collins, Inc., Cedar Rapids, IA (US)

(72) Inventor: Michael L. Oleson, Parkland, FL (US)

(73) Assignee: Rockwell Collins, Inc., Cedar Rapids, IA (US)

(*) Notice: Subject to any disclaimer, the term of this patent is extended or adjusted under 35 U.S.C. 154(b) by 158 days.

(21) Appl. No.: 16/006,397

(22) Filed: Jun. 12, 2018

(51) Int. Cl.
*B64D 11/06* (2006.01)
*B64D 25/00* (2006.01)

(52) U.S. Cl.
CPC ........ *B64D 11/0621* (2014.12); *B64D 11/062* (2014.12); *B64D 11/0619* (2014.12); *B64D 25/00* (2013.01)

(58) Field of Classification Search
CPC ................ B64D 11/0621; B64D 25/00; B64D 11/0619; B64D 11/062
See application file for complete search history.

(56) References Cited

U.S. PATENT DOCUMENTS

| | | | | |
|---|---|---|---|---|
| 5,647,611 A * | 7/1997 | Boyd | ...................... | B60N 2/366 280/801.1 |
| 6,145,881 A * | 11/2000 | Miller, III | ........... | B60R 22/1951 280/801.2 |
| 8,303,042 B2 * | 11/2012 | Kujawa | .................. | B60N 2/688 297/473 |
| 10,071,705 B2 * | 9/2018 | Tanabe | .................... | B60R 22/20 |
| 10,144,397 B2 * | 12/2018 | Lim | .......................... | B60T 7/22 |
| 2005/0189801 A1 * | 9/2005 | Mattes | .................. | B60N 2/688 297/216.13 |
| 2008/0211287 A1 * | 9/2008 | Lamparter | ............. | B60N 2/686 297/468 |
| 2014/0021771 A1 * | 1/2014 | Meister | .................. | B64D 25/06 297/483 |
| 2016/0023764 A1 * | 1/2016 | Brandt | ................. | B64D 11/062 297/466 |
| 2018/0281960 A1 * | 10/2018 | Weingart | ............. | B64D 11/062 |

* cited by examiner

*Primary Examiner* — Darlene P Condra
(74) *Attorney, Agent, or Firm* — Suiter Swantz pc llo

(57) ABSTRACT

A stowable harness fan assembly for a low-back divan is disclosed. In embodiments, the stowable harness fan assembly includes one or more vertical support members, a horizontal support member, and a repositionable harness fan. The horizontal support member is coupled to the one or more vertical support members. The horizontal support member includes an opening and a pivot disposed at one end of the opening. The repositionable harness fan is coupled to the horizontal support member by the pivot and is at least partially disposed within the opening so that the repositionable harness fan can rotate between an open (e.g., raised) configuration and a closed (e.g., stowed) configuration with respect to the opening.

20 Claims, 23 Drawing Sheets

STOWABLE HARNESS FAN ASSEMBLY FOR A LOW-BACK DIVAN

BACKGROUND

Modern business and executive aircraft may incorporate, in addition to or instead of conventional forward-facing single-passenger seating associated with commercial aircraft, convertible seating configurations able to be reconfigured to allow the occupying passengers to sleep in a prone or near-prone position while inflight. For example, divans (e.g., sofas, couches, settees) may accommodate one or more passengers in a forward-facing, aft-facing, or inboard-facing orientation. Such an aircraft divan may be configured for compliance with any applicable seating regulations, e.g., equipped with seatbelts or harnesses to restrain the occupying passengers in an upright position during taxi, takeoff, and landing (TToL) phases or flight segments.

Some business and executive aircraft are configured with pairs of emergency exits located above the side ledge of the aircraft. Seating arrangements that position side-facing divans in front of these exits are required to support emergency egress through the exits. To achieve this access, the divan's backrest structure must be limited to no taller than the side ledge to allow for emergency egress (although backrest cushions may be taller than the ledge if they are made removable to clear the exit path). This backrest structure height restriction prohibits the shoulder harness restraint system anchor to be positioned at the optimal height to restrain the occupant and provide proper occupant protection. FAA Policy PS-ANM-25-03-R1 introduced neck injury requirements (along with additional occupant protection requirements) that warrants the use of inflatable restraint systems (i.e. an airbag in each shoulder harness) to provide this enhanced level of occupant protection. The stowable harness fan assembly described herein is used to position the inflatable shoulder harness at the optimal height for TToL and can be stowed after an emergency event to allow for egress through the exit once the backrest cushions are removed.

SUMMARY

In one aspect, embodiments of the inventive concepts disclosed herein are directed to a stowable harness fan assembly for a low-back divan. In embodiments, the stowable harness fan assembly includes one or more vertical support members, a horizontal support member, and a repositionable harness fan. The horizontal support member is coupled to one or more vertical support members. The horizontal support member includes an opening and a pivot disposed at one end of the opening. The repositionable harness fan is coupled to the horizontal support member by the pivot and is at least partially disposed within the opening so that the repositionable harness fan can rotate between an open (e.g., raised) configuration and a closed (e.g., stowed) configuration with respect to the opening.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
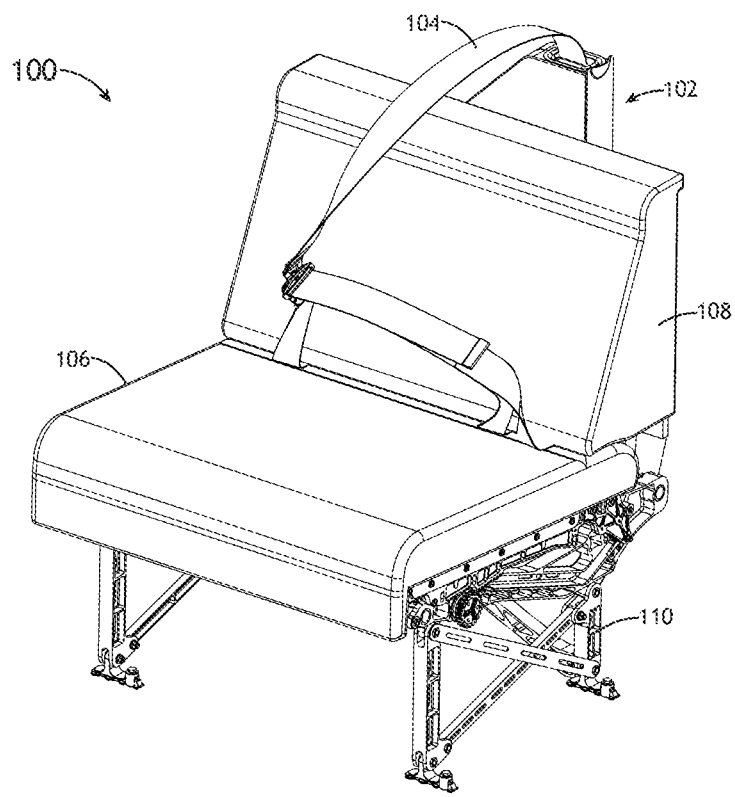
FIG. 1 is a front perspective view of a divan with a stowable harness fan assembly, wherein the stowable harness fan assembly is in an open (e.g., raised) configuration, in accordance with an example embodiment of this disclosure.
Figure 2:
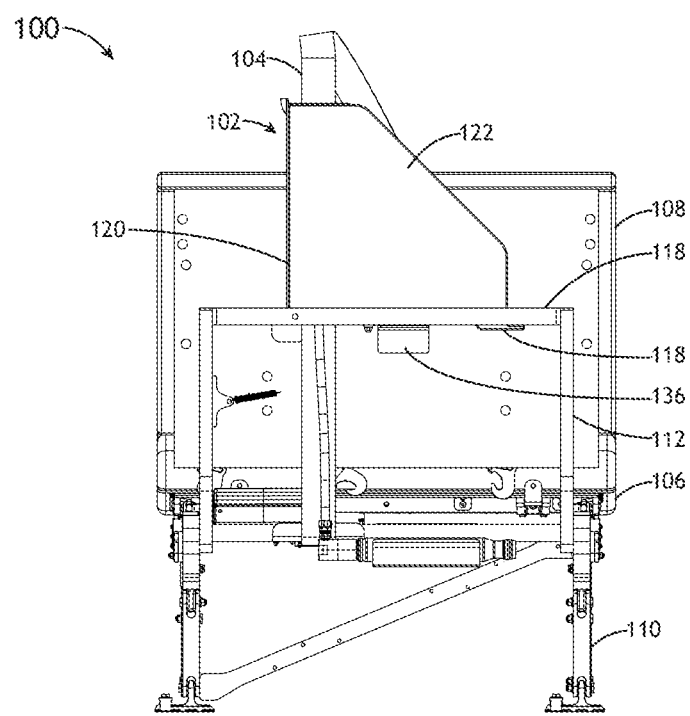
FIG. 2 is a rear view of a divan with a stowable harness fan assembly, wherein the stowable harness fan assembly is in an open (e.g., raised) configuration, in accordance with an example embodiment of this disclosure.
Figure 3:
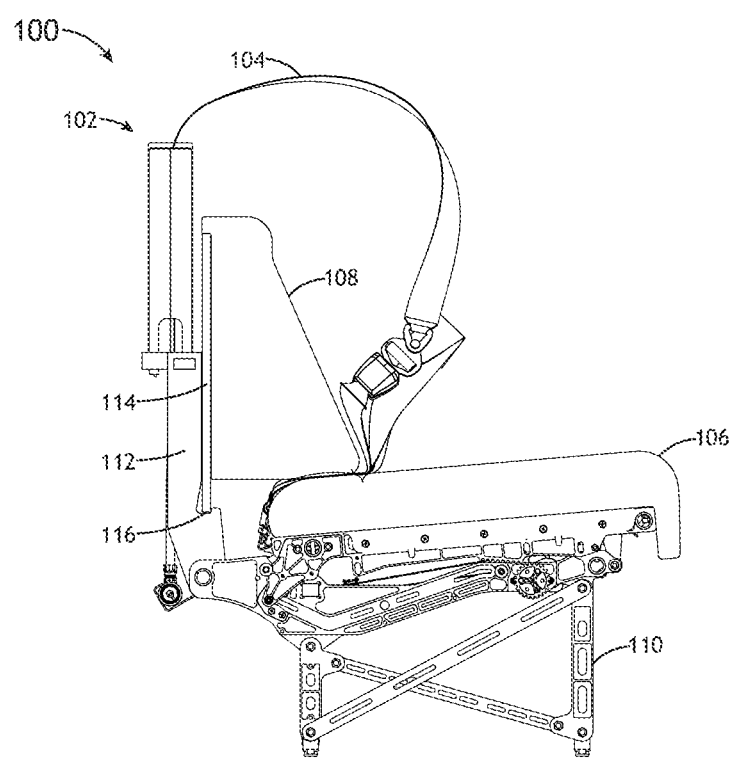
FIG. 3 is a right-side view of a divan with a stowable harness fan assembly, wherein the stowable harness fan assembly is in an open (e.g., raised) configuration, in accordance with an example embodiment of this disclosure.
Figure 4:
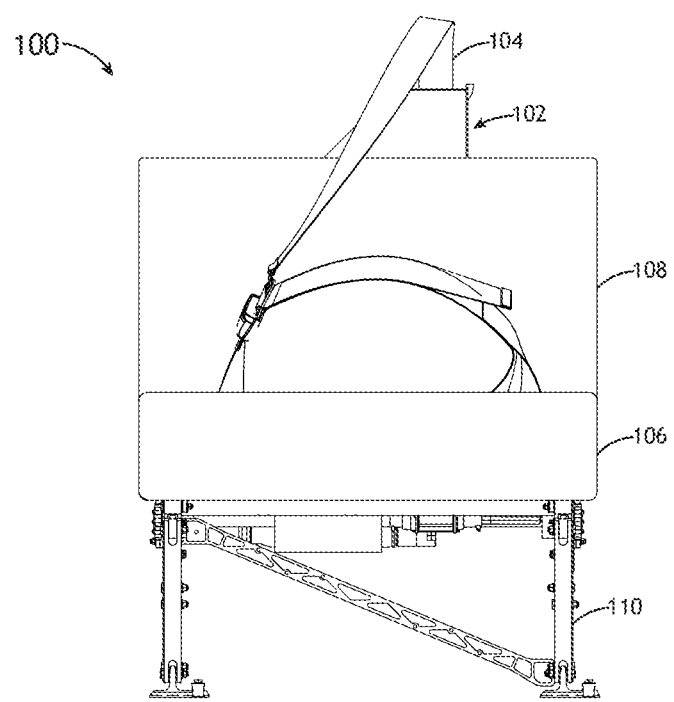
FIG. 4 is a front view of a divan with a stowable harness fan assembly, wherein the stowable harness fan assembly is in an open (e.g., raised) configuration, in accordance with an example embodiment of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a stowable harness fan assembly for a low-back divan. In embodiments, the stowable harness fan assembly includes one or more vertical support members, a horizontal support member, and a repositionable harness fan. The horizontal support member is coupled to the one or more vertical support members. The horizontal support member includes an opening and a pivot disposed at one end of the opening. The repositionable harness fan is coupled to the horizontal support member by the pivot and is at least partially disposed within the opening so that the repositionable harness fan can rotate between an open (e.g., raised) configuration and a closed (e.g., stowed) configuration with respect to the opening.

A divan incorporating the stowable harness fan assembly can be installed in front of an emergency exit. For takeoff and landing, the harness fan can be rotated into the open (e.g., raised) configuration and locked into place. A shoulder harness is pre-routed through the harness fan so that when the harness fan is raised, the harness is positioned just below the seated shoulder height of an average male occupant. This position provides proper occupant torso restraint to meet the stringent FAA requirements for occupant injury protection per 14 CFR 25.562 and FAA Policy PS-ANM-25-03-R1. In some embodiments, the stowable harness fan assembly may be used in conjunction with a shoulder harness that incorporates an airbag to provide head and neck protection that meet the aforementioned FAA requirements.

The auto-stowing capability of the harness fan allows the divan to be installed in front of an emergency exit (commonly referred to as a Type IV exit). This exit is above the side ledge of the aircraft, so the occupants would have to egress the exit by climbing onto and over the divan structure to exit the aircraft. To clear the exit opening for emergency (egress FAA requirement is 10 seconds to clear exit opening), the divan backrest cushion/panel assembly has to be removed. The stowable harness fan assembly may include a bracket on the backrest panel that is used to lock the harness fan in the open (e.g., raised) configuration. Thus, once the backrest cushion/panel assembly is removed, the bracket is withdrawn, and the harness fan can automatically rotate (e.g., by spring action) downward to clear the exit opening for egress. This automatic stowing action can support the exit clearing if the exit plug is to be removed from the inside or outside of the aircraft. The backrest cushion/panel assembly clearing can also be done be pushing the exit plug into the backrest cushion/panel assembly, thereby pushing the bracket out of place so that the harness fan is released from the open configuration and automatically stowed.

Details of the stowable harness fan assembly structure and its use are further described below with reference to drawings. FIGS. 1 through 23 illustrate example embodiments of a divan 100 with a stowable harness fan assembly 102. As shown in FIGS. 1 through 4, the divan 100 includes a seat cushion 106, a backrest cushion 108, and a support frame 110. The support frame 110 is configured to be mounted to a floor of a passenger cabin (e.g., an aircraft cabin). For example, the support frame 110 can include a plurality of legs that can be installed into seat track. The support frame 110 is configured to support the seat cushion 106. In some embodiments, the seat cushion 106 includes a seat panel that can be coupled to support frame 110. For example, the seat cushion 106 and/or panel can be removably coupled to the support frame 110. In some embodiments, the seat cushion 106 and/or panel may be attached to one or more moveable components (e.g., tracking platform) that allow the seat cushion 106 to be repositioned and/or tilted (e.g., to at least partially recline the divan 100). For example, the seat cushion 106 removably attached to a tracking platform using Velcro, or the like.

Figure 5:
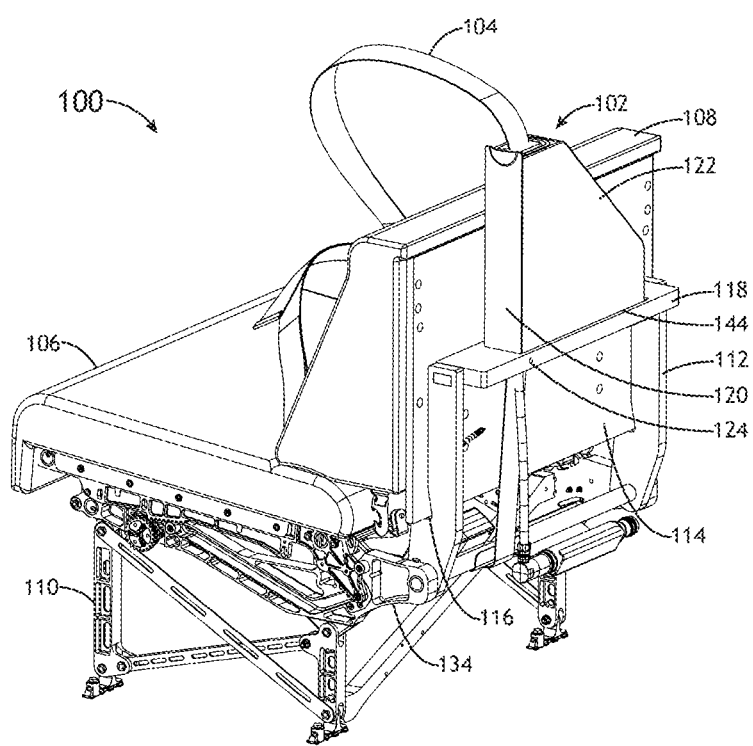
FIG. 5 is a rear perspective view of a divan with a stowable harness fan assembly, wherein the stowable harness fan assembly is in an open (e.g., raised) configuration, in accordance with an example embodiment of this disclosure.

As shown in FIG. 5, the backrest can include a backrest panel 114 configured to support the backrest cushion 108. At least one vertical support member 112 is coupled to a rear portion of the support frame 110 and configured to support the backrest. For example, the divan 100 may include one, two, or more vertical support members 112 that provide support for the backrest panel 114. In embodiments, at least one vertical support member 112 includes a notch 116 that is configured to receive a portion of the backrest panel 114 so that the backrest panel 114 is removably coupled to the vertical support member 112. For example, the backrest panel 114 can be held in place by the notch 116. In the embodiments illustrated in FIGS. 1 through 23, the divan 100 is shown to include two vertical support members 112 with respective notches 116 that receive portions of the backrest panel 114 near the left and right ends of the panel 114. In other embodiments, the divan 100 can include a single (e.g., centrally located) vertical support member 112, or any other number of vertical support members 112 configured to support the backrest panel 114 so that the backrest cushion 108 is held in place but capable of being removed. Furthermore, the one or more vertical support members 112 may be slightly angled and or adjustable (e.g., capable of being tilted forward or backward) so that the backrest cushion 108 is in a comfortable position and/or adjustable according to the passenger preferences.

Figure 15:
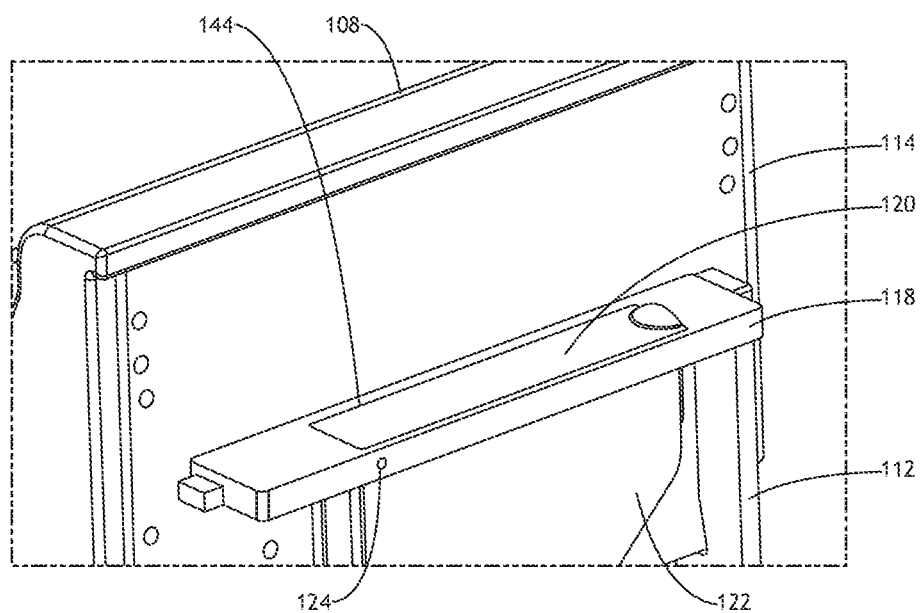
FIG. 15 is a partial rear perspective view of a divan with a stowable harness fan assembly, wherein the stowable harness fan assembly is in closed (e.g., stowed) configuration, in accordance with an example embodiment of this disclosure.

The stowable harness fan assembly 102 is coupled to the back of the divan 100 with at least one harness strap 104 (e.g., shoulder strap) routed through the harness fan assembly 102 so that the harness strap 104 is accessible to a user when the harness fan assembly 102 is in an open (e.g., raised) configuration. In embodiments, the stowable harness fan assembly 102 is coupled to the back of the divan 100 by a horizontal support member 118 that is disposed upon (and coupled to) the one or more vertical support member 112. As shown in FIG. 15, the horizontal support member 118 includes an opening 144 with a pivot 124 disposed at one end of the opening 144.

The stowable harness fan assembly 102 includes a repositionable harness fan 122. In embodiments, the repositionable harness fan 122 comprises a harness support structure with a fan-like configuration; that is, the repositionable harness fan 122 can be configured to open out and stow away by rotating about the pivot 124, which may be coupled to a portion (e.g., a corner) of the repositionable harness fan 122. The repositionable harness fan 122 coupled to the horizontal support member 118 by the pivot 124. In embodiments, the repositionable harness fan 122 may have a somewhat triangular or quarter circle shape, or the like (e.g., as shown in FIGS. 1 through 23).

Figure 6:
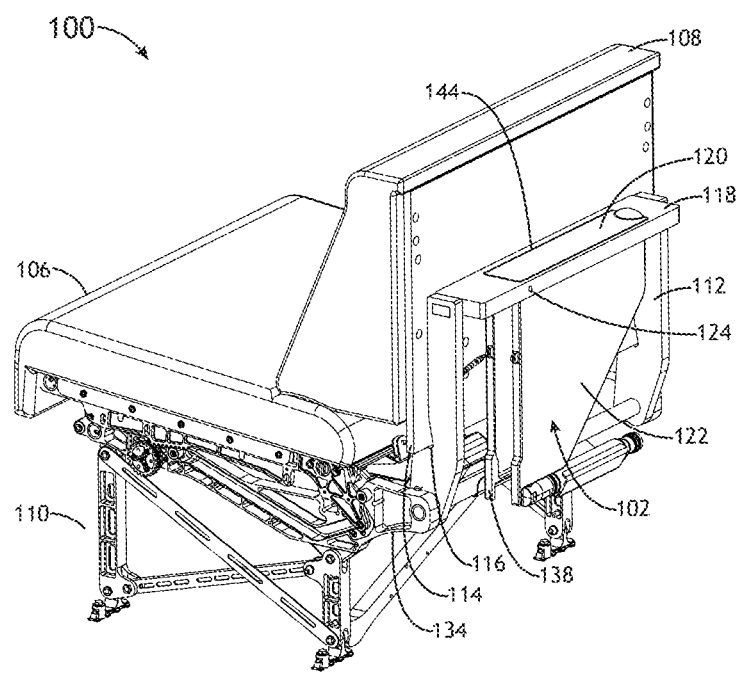
FIG. 6 is a rear perspective view of a divan with a stowable harness fan assembly, wherein the stowable harness fan assembly is in a closed (e.g., stowed) configuration, in accordance with an example embodiment of this disclosure.
Figure 7:
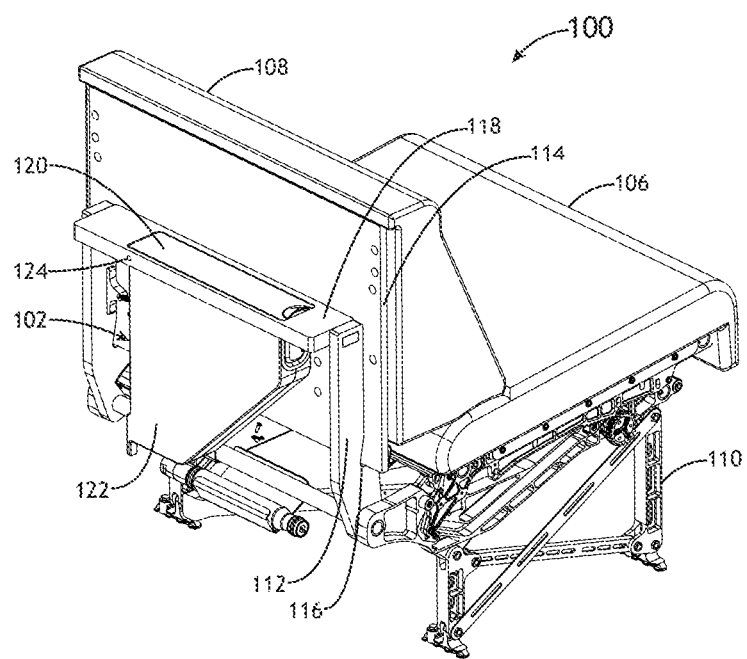
FIG. 7 is a rear perspective view of a divan with a stowable harness fan assembly, wherein the stowable harness fan assembly is in a closed (e.g., stowed) configuration, in accordance with an example embodiment of this disclosure.
Figure 8A:
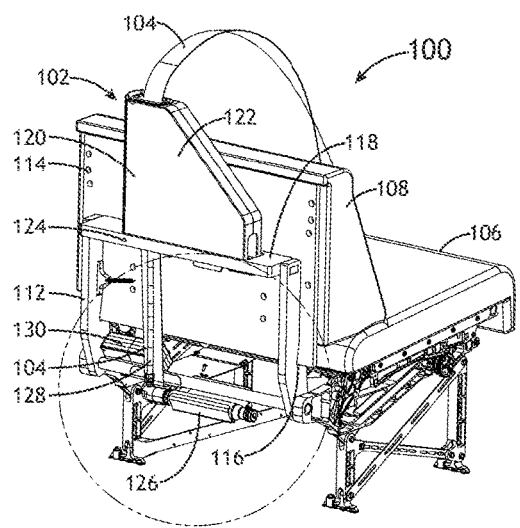
FIG. 8A is a rear perspective view of a divan with a stowable harness fan assembly, wherein the stowable harness fan assembly is in an open (e.g., raised) configuration, in accordance with an example embodiment of this disclosure.
Figure 8B:
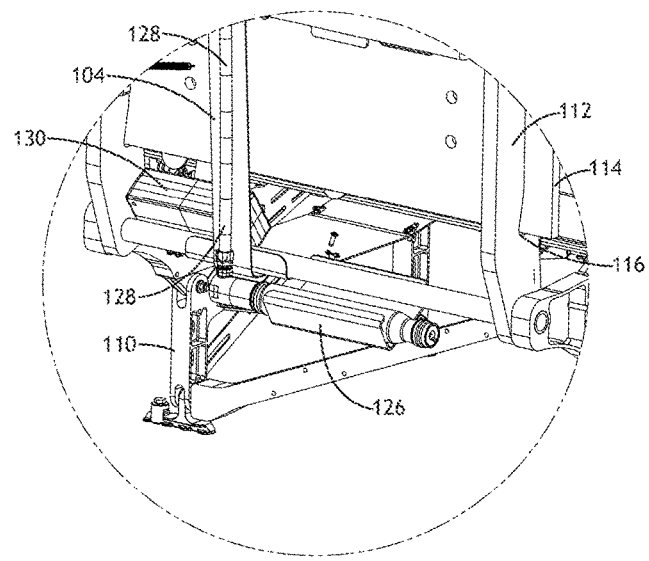
FIG. 8B is a zoomed in view of a lower portion of the divan shown in FIG. 8A, in accordance with an example embodiment of this disclosure.
Figure 9A:
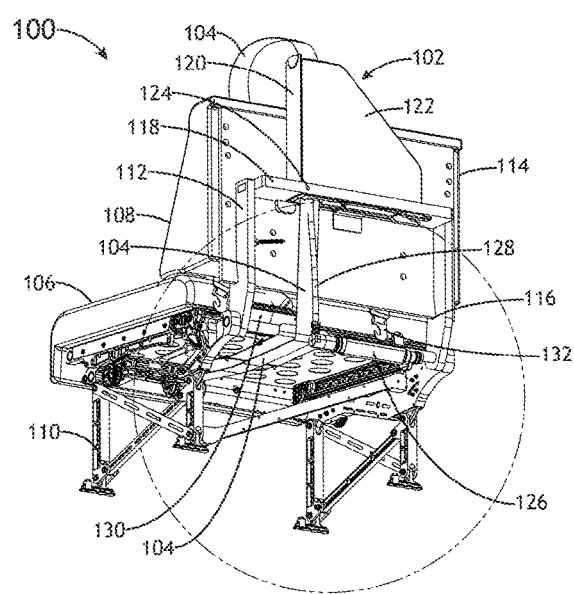
FIG. 9A is a rear perspective view of a divan with a stowable harness fan assembly, wherein the stowable harness fan assembly is in an open (e.g., raised) configuration, in accordance with an example embodiment of this disclosure.
Figure 12:
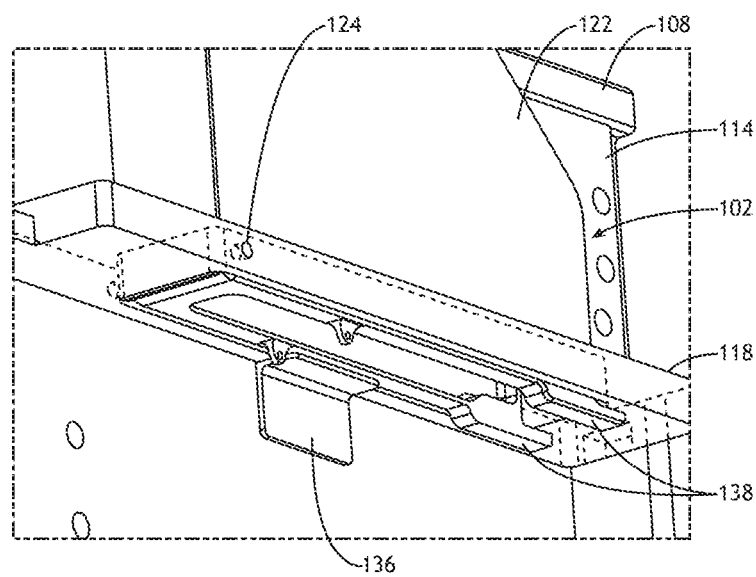
FIG. 12 is a partial rear perspective view of a divan with a stowable harness fan assembly, wherein the stowable harness fan assembly is in an open (e.g., raised) configuration, in accordance with an example embodiment of this disclosure.

The repositionable harness fan 122 is at least partially disposed within the opening 144 defined by the horizontal support member 118 and is configured to rotate between an open (e.g., raised) configuration and a closed (e.g., stowed) configuration with respect to the opening 144. For example, FIGS. 6 and 7 show the repositionable harness fan 122 rotated into the closed (e.g., stowed) configuration, and FIGS. 8A and 9A show the repositionable harness fan 122 rotated into the open (e.g., raised) configuration. As shown in FIGS. 6 and 7, the repositionable harness fan 122 has a cover 120 extending across an edge of the repositionable harness fan 122. The cover 120 is configured to extends over the opening 144 and prevent a portion of the repositionable harness fan 122 from rotating past the opening 144 when the repositionable harness fan 122 is in the closed (e.g., stowed) configuration. In embodiments, the cover 120 has a handle or grip that can be pulled on to raise the repositionable harness fan 122 in order to transition the repositionable harness fan 122 from the closed (e.g., stowed) configuration to the open (e.g., raised) configuration. In some embodiments, the cover 120 (or most of the cover 120) is flush with the horizontal support member 118 when the repositionable harness fan 122 is in the closed (e.g., stowed) configuration. As shown in FIG. 12, the repositionable harness fan 122 may further include a stopper 138 that prevents a portion of the repositionable harness fan 122 from rotating past the opening 144 when the repositionable harness fan 122 is in the open (e.g., raised) configuration. For example, the stopper 138 may be defined by one or more protrusions that extend outwardly from the bottom of the repositionable harness fan 122 when the repositionable harness fan 122 is in the open (e.g., raised) configuration. In embodiments, the stopper 138 may be located at an end of the repositionable harness fan 122 that is opposite the end that the pivot 124 is coupled to.

FIGS. 8A through 9B show rear portions of the divan 100 in accordance with example embodiments of this disclosure. As shown in FIGS. 8A through 9B, the harness fan assembly 102 may be operable in conjunction with a harness strap 104 that includes at least one airbag (e.g., built into the shoulder strap). In such embodiments, the divan 100 may include a crash sensor 130 and a gas inflator 126 coupled to the support frame 110. The gas inflator 126 can be fluidically coupled (e.g., by tubing 128) to the airbag in the harness strap 104. The gas inflator 126 can be configured to inflate the airbag when a crash event is detected. For example, in some embodiments, the gas inflator 126 is configured to inflate the airbag in response to a signal from the crash sensor 130. For example, the crash sensor 130 can comprise a force sensor, shock sensor, inertial sensor (e.g., accelerometer/gyroscope), pressure sensor, or the like. In embodiments, the crash sensor 130 may be configured to generate a signal indicating a crash event when a detected force, shock, change in acceleration, or change in cabin pressure above a threshold is detected.

Figure 9B:
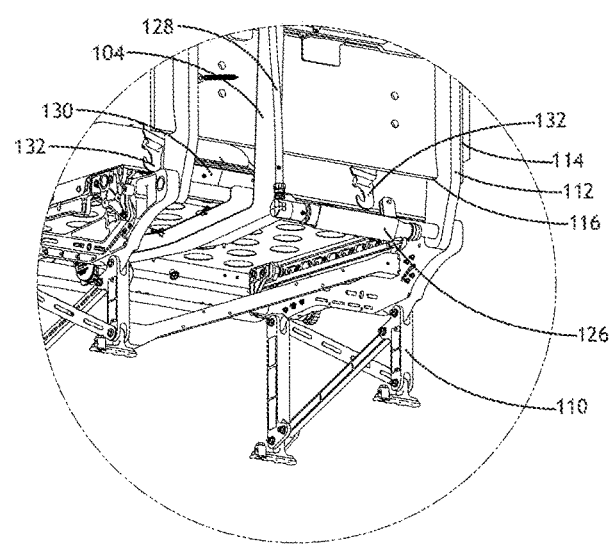
FIG. 9B is a zoomed in view of a lower portion of the divan shown in FIG. 9A, in accordance with an example embodiment of this disclosure.

As shown in FIGS. 9A and 9B, the harness can further include at least one lap/torso strap 132 that can be coupled to the support frame 110 (e.g., by hooks, latches, buckles, or the like). In embodiments, one or more connectors on the harness strap 104 (e.g., shoulder strap) that is routed through the repositionable harness fan 122 can be configured to mate with one or more connectors on the lap/torso strap 132. In this manner, the divan 100 can provide lap/torso and shoulder restraint or simply lap/torso restraint (e.g., when the harness fan assembly 102 is in the closed (e.g., stowed) configuration).

Figure 10:
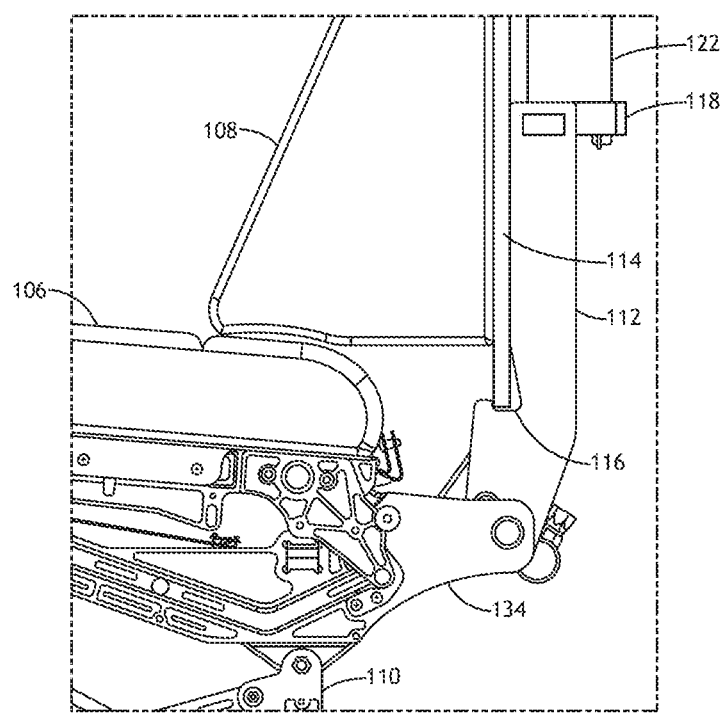
FIG. 10 is a partial left side view of a divan with a stowable harness fan assembly, wherein the stowable harness fan assembly is in an open (e.g., raised) configuration, in accordance with an example embodiment of this disclosure.

A side view of the divan 100 is shown in FIG. 10 according to an example embodiment of this disclosure. In embodiments, the divan 100 includes a seat rail 134 that is coupled to the support frame 110. The seat cushion 106 may be coupled to a seat panel and/or other mechanical linkages that are connected to the seat rail 134. In some embodiments, the seat panel and/or mechanical linkages are configured to slide along a track defined by the seat rail 134 so that the seat cushion 106 can be repositioned and/or tilted. The one or more vertical support structures 112 may be coupled to the seat rail 134. In some embodiments, the one or more vertical support structures 112 are coupled to the seat rail 134 by a pivot and may be configured to rotate about the pivot so that the backrest cushion 108 can be moved forward/backward and/or reclined.

Figure 11:
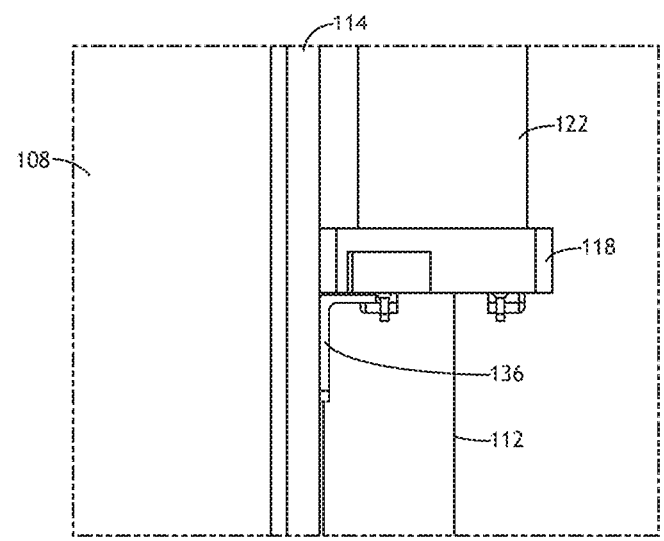
FIG. 11 is a partial left side view of a divan with a stowable harness fan assembly, wherein the stowable harness fan assembly is in an open (e.g., raised) configuration, in accordance with an example embodiment of this disclosure.

Referring now to FIGS. 11 and 12, the repositionable harness fan 122 can be locked in the open (e.g., raised) configuration by a bracket 136 that is coupled to the backrest panel 114. For example, the bracket 136 is configured to support the repositionable harness fan 122 when the repositionable harness fan 122 is in the open (e.g., raised) configuration. In embodiments, the bracket 136 includes a tongue that protrudes outwardly from the backrest panel 114 and at least partially obstructs the opening 144 so that it prevents the repositionable harness fan 122 from rotating back down into the opening (i.e., back to the closed/stowed configuration). In some implementations, the repositionable harness fan 122 is transitioned into the open (e.g., raised) configuration by pushing or tilting the backrest panel 114 forward so that the bracket 136 is temporarily moved away from the opening while the repositionable harness fan 122 is rotated through the opening into the open (e.g., raised) configuration. The backrest panel 114 can then be returned to its original position so that the bracket 136 at least partially obstructs the opening 144, thereby locking the repositionable harness fan 122 in the open (e.g., raised) configuration.

The backrest cushion 108 and panel 114 may be removed by tilting the backrest cushion 108/panel 114 forwards and pushing/pulling it away from the vertical support member 112. Alternatively, the backrest cushion 108 and panel 114 may be removed by pushing the backrest cushion 108/panel 114 sideways to slide the backrest panel 114 through the notch 116 until it clears the vertical support member 112. For example, this may occur in an emergency situation where the emergency exit plug is pushed inwards (i.e., into the aircraft). When the backrest panel 114 is removed, the bracket 136 consequently disengages the repositionable harness fan 122. Thus, if the repositionable harness fan 122 in the open (e.g., raised) configuration, it will be released and will return to the closed (e.g., stowed) configuration. In some embodiments, the repositionable harness fan 122 is coupled to a vertical support member 112 and/or horizontal support member 118 by a spring that applies tension to the repositionable harness fan 122 so that it automatically returns to the closed (e.g., stowed) configuration when the bracket 136 disengages the repositionable harness fan 122 and releases it from the open (e.g., raised) configuration. For example, as shown in FIGS. 19 through 22, the divan 100 may include an extension spring 152 (FIGS. 19 and 20), a gas spring 154 (FIG. 21), and/or a torsion spring 156 (FIG. 22) configured to apply tension to the repositionable harness fan 122 when the repositionable harness fan 122 is in the open (e.g., raised) configuration so that the repositionable harness fan 122 is automatically pulled down into the closed (e.g., stowed) configuration when the bracket 136 is moved out of contact with the repositionable harness fan 122.

Figure 13:
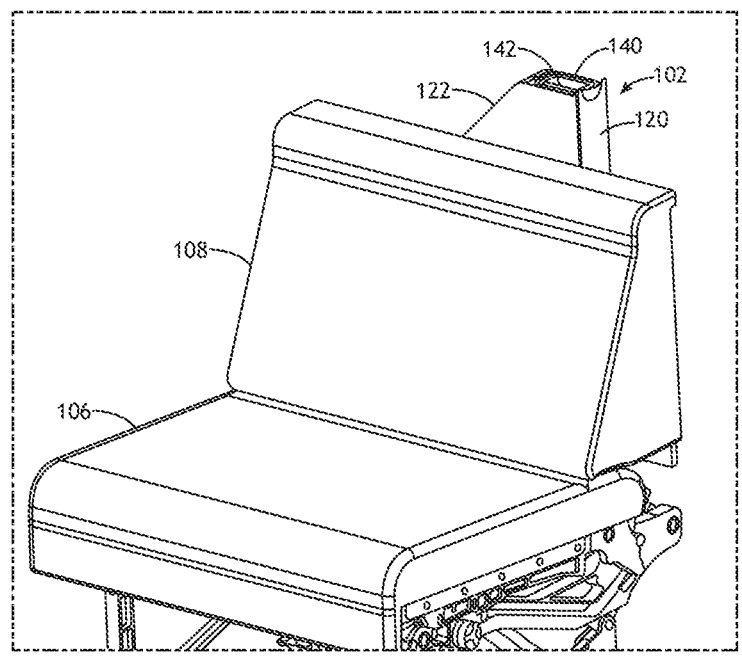
FIG. 13 is a partial front perspective view of a divan with a stowable harness fan assembly, wherein the stowable harness fan assembly is in an open (e.g., raised) configuration, in accordance with an example embodiment of this disclosure.
Figure 14:
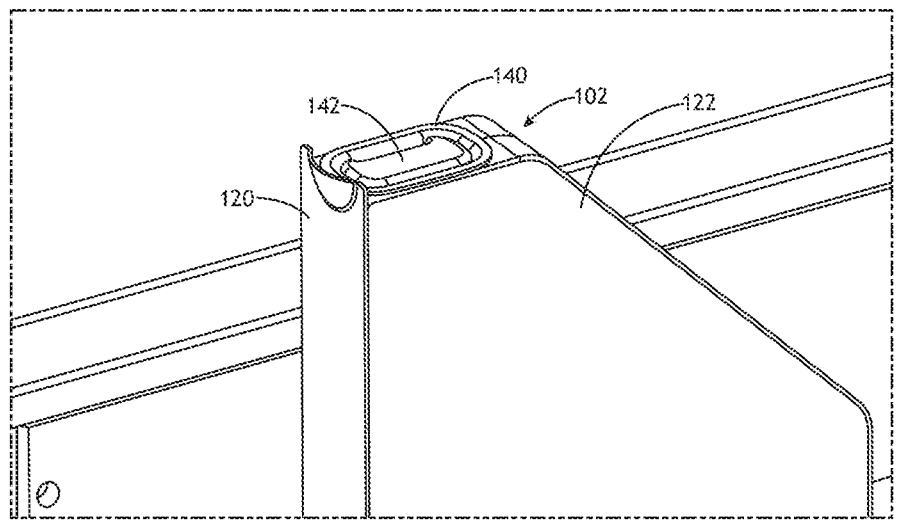
FIG. 14 is a partial rear perspective view of a divan with a stowable harness fan assembly, wherein the stowable harness fan assembly is in an open (e.g., raised) configuration, in accordance with an example embodiment of this disclosure.
Figure 16:
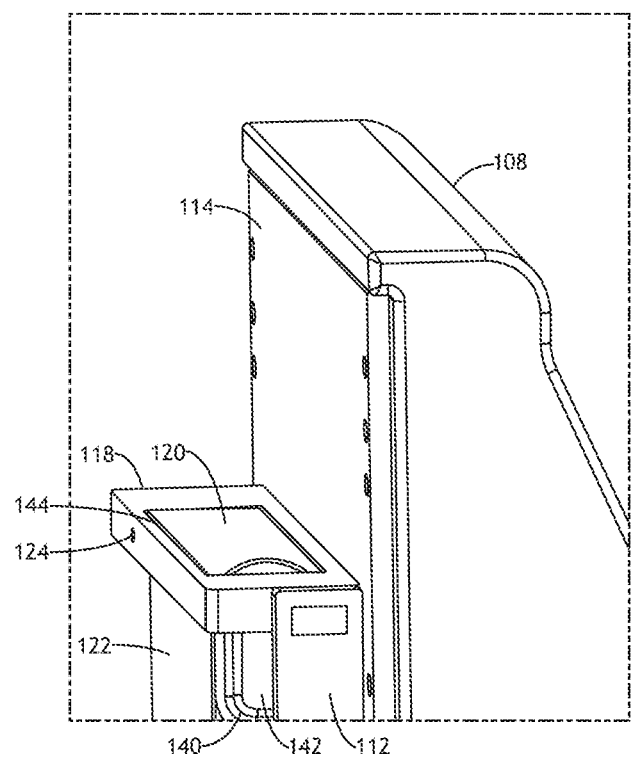
FIG. 16 is a partial right side perspective view of a divan with a stowable harness fan assembly, wherein the stowable harness fan assembly is in closed (e.g., stowed) configuration, in accordance with an example embodiment of this disclosure.
Figure 17:
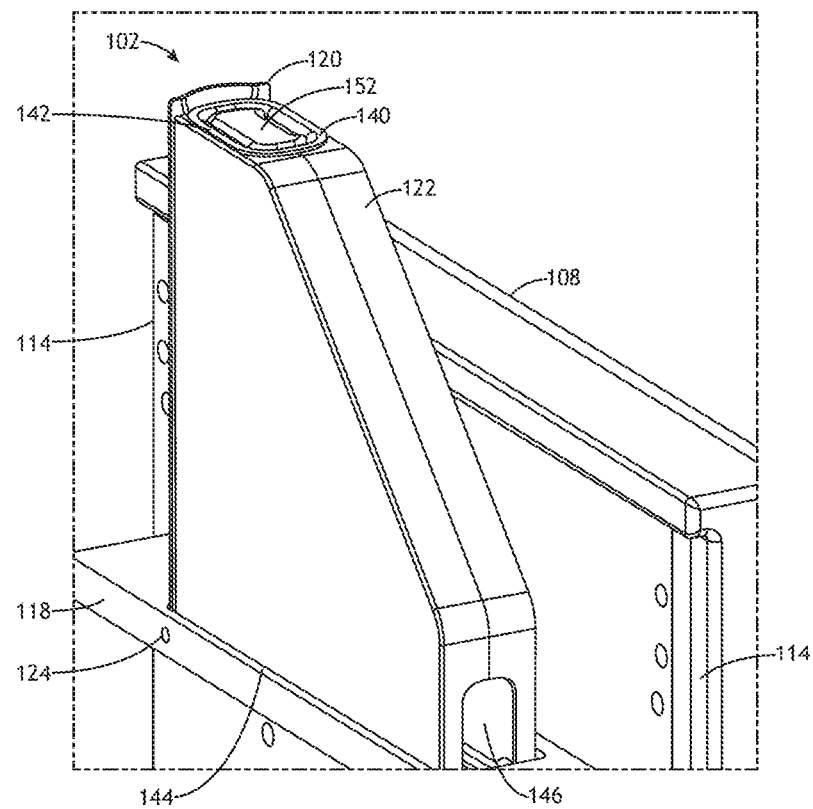
FIG. 17 is a partial rear perspective view of a divan with a stowable harness fan assembly, wherein the stowable harness fan assembly is in an open (e.g., raised) configuration, in accordance with an example embodiment of this disclosure.
Figure 23:
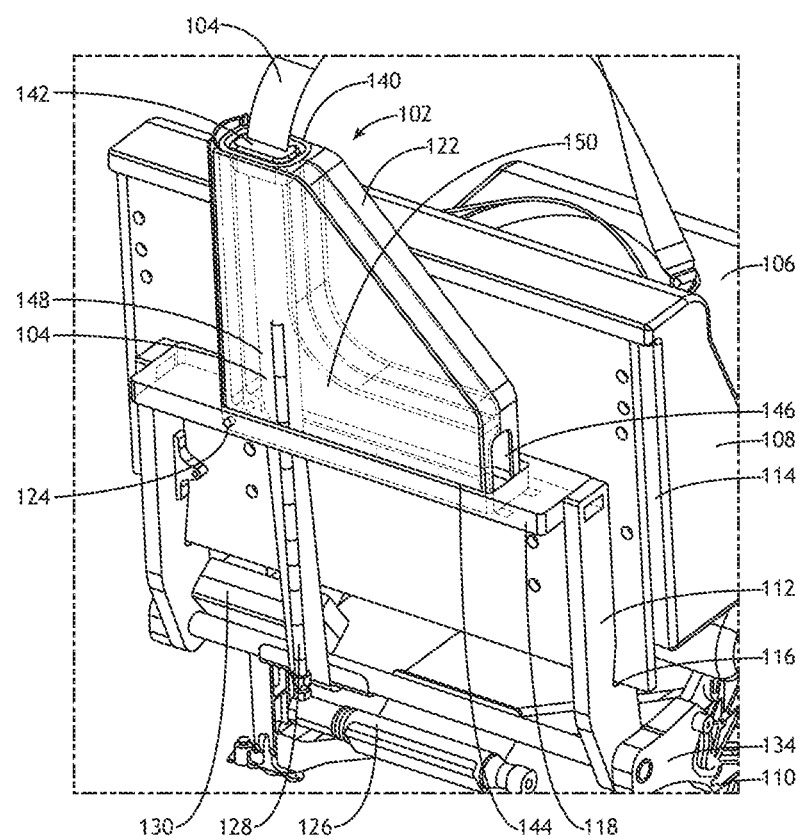
FIG. 23 is a partial rear perspective view of a divan with a stowable harness fan assembly, wherein the stowable harness fan assembly is in an open (e.g., raised) configuration, in accordance with an example embodiment of this disclosure.

As shown in FIGS. 13 and 14, the repositionable harness fan 122 includes an outlet 142 for the harness strap 104. For example, FIG. 23 shows the harness strap 104 routed through a cavity 148 in the repositionable harness fan 122 and extended through the outlet 142, where the outlet 142 is disposed at one end of the cavity 148. In embodiments, the repositionable harness fan 122 may include a bezel 144 disposed about the outlet 142 to provide supportive structure for the outlet 142 and/or to produce a pleasing aesthetic appearance. As shown in FIG. 16, when the repositionable harness fan 122 is in the closed (e.g., stowed) configuration, the outlet 142 may stow into the opening 144 but can still hold the harness strap 104 within the cavity 148. For example, the outlet 142 may be configured to hold a harness strap connector (e.g., seat belt buckle or tongue) so that the harness strap 104 does not need to be rerouted through the cavity 148. FIG. 17 shows an example embodiment of the repositionable harness fan 122 in the open (e.g., raised) configuration with a harness strap connector 152 (e.g., seat belt buckle) held by the outlet 142.

Figure 18:
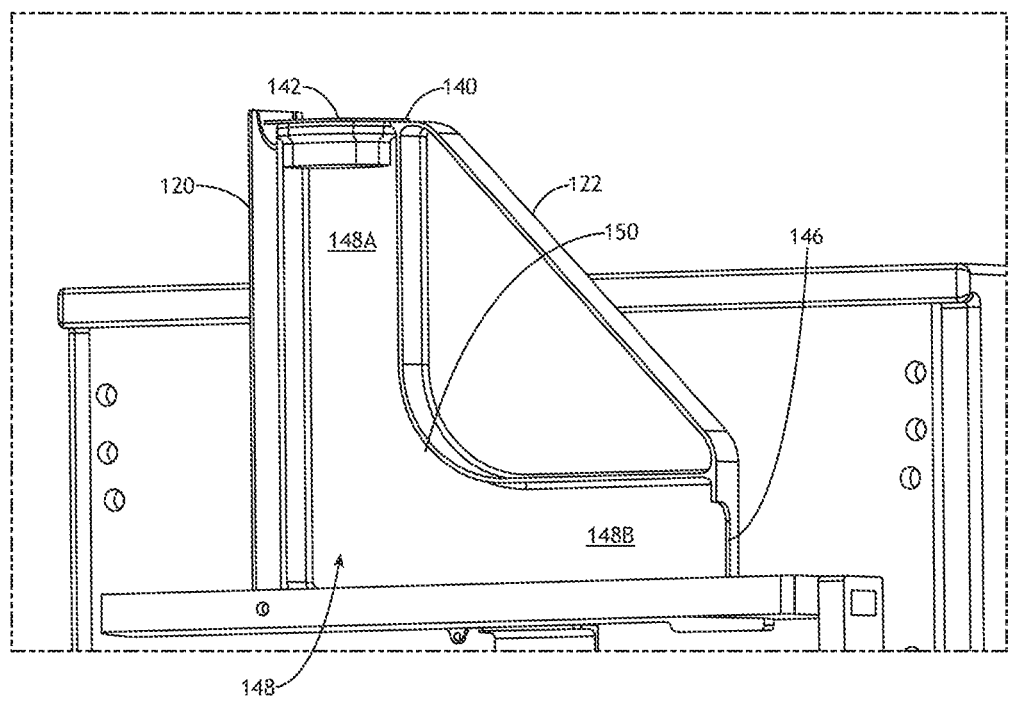
FIG. 18 is a partial rear perspective view of a divan with a stowable harness fan assembly, wherein the stowable harness fan assembly is in an open (e.g., raised) configuration, in accordance with an example embodiment of this disclosure.
Figure 19:
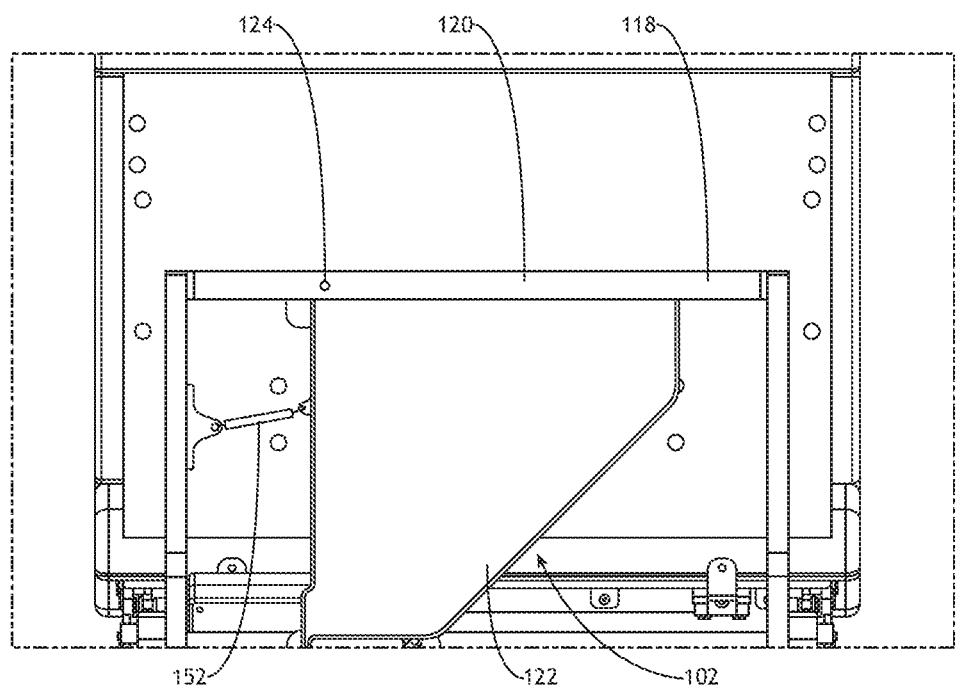
FIG. 19 is a partial rear view of a divan with a stowable harness fan assembly, wherein the stowable harness fan assembly is in closed (e.g., stowed) configuration, in accordance with an example embodiment of this disclosure.
Figure 20:
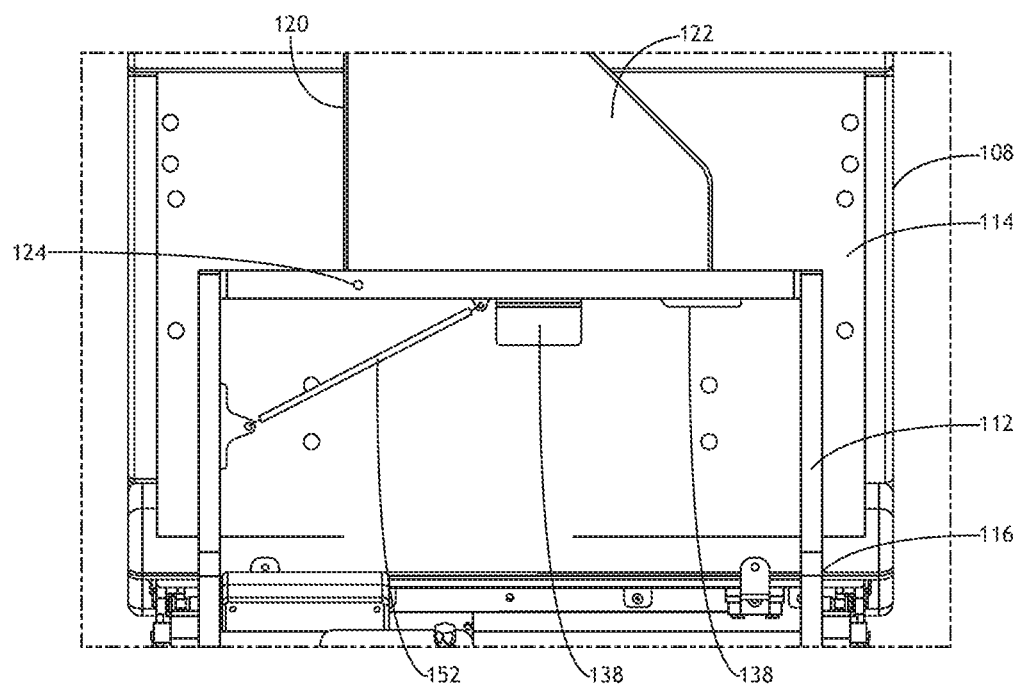
FIG. 20 is a partial rear view of a divan with a stowable harness fan assembly, wherein the stowable harness fan assembly is in an open (e.g., raised) configuration, in accordance with an example embodiment of this disclosure.
Figure 21:
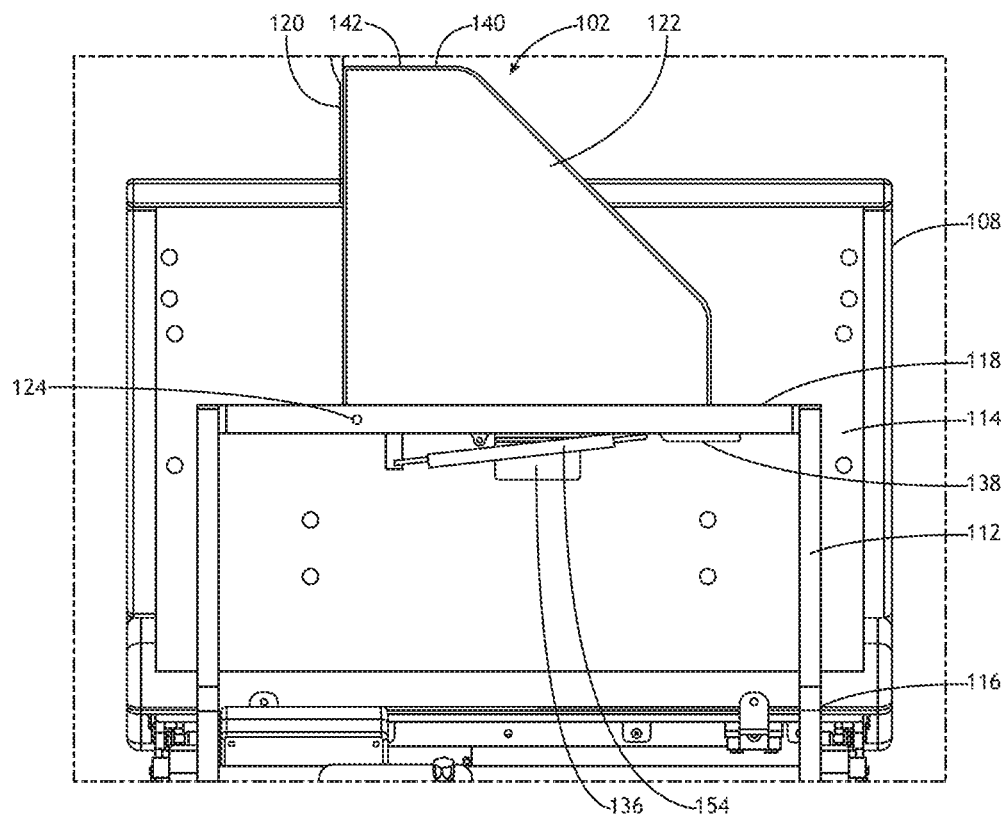
FIG. 21 is a partial rear view of a divan with a stowable harness fan assembly, wherein the stowable harness fan assembly is in an open (e.g., raised) configuration, in accordance with an example embodiment of this disclosure.
Figure 22:
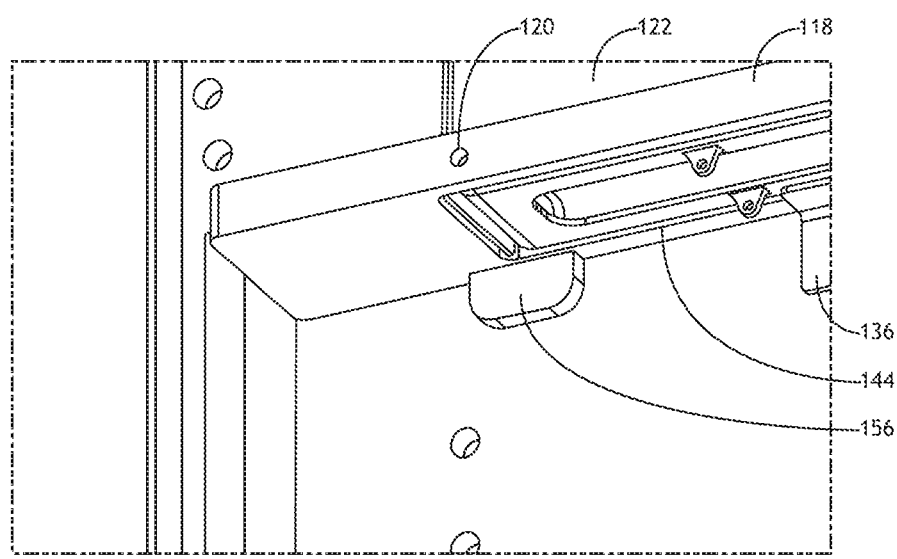
FIG. 22 is a partial rear perspective view of a divan with a stowable harness fan assembly, wherein the stowable harness fan assembly is in an open (e.g., raised) configuration, in accordance with an example embodiment of this disclosure.

In embodiments, the cavity 148 may be "L" or "V" shaped. For example, as shown in FIG. 18, the cavity 148 can be "L" or "V" shaped with a first cavity portion 148A and a second cavity portion 148B angled with respect to one another. The cavity 148 may include a bent or curved inner wall 150 between the first cavity portion 148A and the second cavity portion 148B. As shown in FIG. 23, the harness strap 104 is configured to extend through the first cavity portion 148A when the repositionable harness fan 122 is in the open (e.g., raised) configuration. Then, when the repositionable harness fan 122 is in the closed (e.g., stowed) configuration, the harness strap 104 extends through the second cavity portion 148B, around the bent or curved inner wall 150, and through the first cavity portion 148A to the outlet 142. In embodiments, an inlet 146 may be located at an end of the second cavity portion 148B so that the harness strap 104 can go through the inlet 146, into the second cavity portion 148B, around the bent or curved inner wall 150, and through the first cavity portion 148A when the repositionable harness fan 122 is in the closed (e.g., stowed) configuration.

The divan 100 illustrated in FIGS. 1 through 23 is one example of a divan structure that can employ the harness fan assembly 102 described herein. Other divan structures can be similarly equipped. For example, in some embodiments, the harness fan assembly 102 can be installed in a slouching divan, such as the "Slouching Divan with Damped Motion" described in U.S. patent application Ser. No. 15/950,079, by Michael L. Oleson et al., filed Apr. 10, 2018. U.S. patent application Ser. No. 15/950,079 is incorporated herein by reference, in its entirety.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A stowable harness fan assembly for a divan, comprising:
   at least one vertical support member;
   a horizontal support member coupled to the at least one vertical support member, the horizontal support member including an opening and a pivot disposed at one end of the opening; and
   a repositionable harness fan coupled to the horizontal support member by the pivot, the repositionable harness fan being at least partially disposed within the opening and configured to rotate between an open configuration and a closed configuration with respect to the opening.

2. The stowable harness fan assembly of claim 1, wherein the repositionable harness fan includes a cover that extends over the opening and prevents a portion of the repositionable harness fan from rotating past the opening when the repositionable harness fan is in the closed configuration.

3. The stowable harness fan assembly of claim 1, wherein the repositionable harness fan includes a stopper that prevents a portion of the repositionable harness fan from rotating past the opening when the repositionable harness fan is in the open configuration.

4. The stowable harness fan assembly of claim 1, wherein the repositionable harness fan includes a cavity configured to receive a portion of a harness strap.

5. The stowable harness fan assembly of claim 4, wherein the repositionable harness fan further includes an outlet disposed at one end of the cavity, wherein the harness strap extends through the outlet.

6. The stowable harness fan assembly of claim 4, wherein the repositionable harness fan further includes a bezel disposed about the outlet.

7. The stowable harness fan assembly of claim 4, wherein the cavity includes a first cavity portion and a second cavity portion with a bent or curved inner wall between the first cavity portion and the second cavity portion, wherein the harness strap extends through the first cavity portion when the repositionable harness fan is in the open configuration, and wherein the harness strap extends through the second cavity portion, around the bent or curved inner wall, and through the first cavity portion when the repositionable harness fan is in the closed configuration.

8. The stowable harness fan assembly of claim 1, further comprising a bracket coupled to a backrest panel of the divan, the bracket configured to support the repositionable harness fan when the repositionable harness fan is in the open configuration.

9. The stowable harness fan assembly of claim 1, further comprising at least one of an extension spring, a gas spring, or a torsion spring configured to apply tension to the repositionable harness fan when the repositionable harness fan is in the open configuration, wherein the at least one of the extension spring, the gas spring, or the torsion spring automatically transitions the repositionable harness fan to the closed configuration when the repositionable harness fan is released from the open configuration.

10. The stowable harness fan assembly of claim 1, further comprising a crash sensor and a gas inflator, the gas inflator being fluidically coupled to an airbag in a harness strap that is routed through the repositionable harness fan, wherein the gas inflator is configured to inflate the airbag in response to a signal from the crash sensor.

11. A divan, comprising:
    a support frame configured to be mounted to a floor of a passenger cabin;
    a seat cushion that is supported by the support frame;
    a backrest including a backrest panel and a backrest cushion that is supported by the backrest panel;
    at least one vertical support member coupled to a rear portion of the support frame, the at least one vertical support member including at least one notch that is configured to receive the backrest panel to removably couple the backrest to the at least one vertical support member;
    a horizontal support member coupled to the at least one vertical support member, the horizontal support member including an opening and a pivot disposed at one end of the opening; and
    a repositionable harness fan coupled to the horizontal support member by the pivot, the repositionable harness fan being at least partially disposed within the opening and configured to rotate between an open configuration and a closed configuration with respect to the opening.

12. The divan of claim 11, wherein the repositionable harness fan includes a cover that extends over the opening and prevents a portion of the repositionable harness fan from rotating past the opening when the repositionable harness fan is in the closed configuration.

13. The divan of claim 11, wherein the repositionable harness fan includes a stopper that prevents a portion of the repositionable harness fan from rotating past the opening when the repositionable harness fan is in the open configuration.

14. The divan of claim 11, wherein the repositionable harness fan includes a cavity configured to receive a portion of a harness strap.

15. The divan of claim 14, wherein the repositionable harness fan further includes an outlet disposed at one end of the cavity, wherein the harness strap extends through the outlet.

16. The divan of claim 14, wherein the repositionable harness fan further includes a bezel disposed about the outlet.

17. The divan of claim 14, wherein the cavity includes a first cavity portion and a second cavity portion with a bent or curved inner wall between the first cavity portion and the second cavity portion, wherein the harness strap extends through the first cavity portion when the repositionable harness fan is in the open configuration, and wherein the harness strap extends through the second cavity portion, around the bent or curved inner wall, and through the first cavity portion when the repositionable harness fan is in the closed configuration.

18. The divan of claim 11, further comprising a bracket coupled to the backrest panel, the bracket configured to support the repositionable harness fan when the repositionable harness fan is in the open configuration.

19. The divan of claim 11, further comprising at least one of an extension spring, a gas spring, or a torsion spring configured to apply tension to the repositionable harness fan when the repositionable harness fan is in the open configuration, wherein the at least one of the extension spring, the gas spring, or the torsion spring automatically transitions the repositionable harness fan to the closed configuration when the repositionable harness fan is released from the open configuration.

20. The divan of claim 11, further comprising a crash sensor and a gas inflator coupled to the support frame, the gas inflator being fluidically coupled to an airbag in a harness strap that is routed through the repositionable harness fan, wherein the gas inflator is configured to inflate the airbag in response to a signal from the crash sensor.

* * * * *